United States Patent
Li

(10) Patent No.: US 12,197,619 B2
(45) Date of Patent: Jan. 14, 2025

(54) INTERACTIVE METHODS, ELECTRONIC DEVICES AND STORAGE MEDIA

(71) Applicant: BOE Technology Group Co., Ltd., Beijing (CN)

(72) Inventor: Ting Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 651 days.

(21) Appl. No.: 17/461,702

(22) Filed: Aug. 30, 2021

(65) Prior Publication Data
US 2022/0156403 A1    May 19, 2022

(30) Foreign Application Priority Data
Nov. 18, 2020    (CN) .......................... 202011291444.7

(51) Int. Cl.
G06F 21/62    (2013.01)
G06F 21/31    (2013.01)

(52) U.S. Cl.
CPC .......... *G06F 21/6245* (2013.01); *G06F 21/31* (2013.01)

(58) Field of Classification Search
CPC ...... G06F 21/6245; G06F 21/31; G06F 21/32; G06F 21/35; G06F 21/6218; G16H 40/20
USPC .......................................................... 726/7
See application file for complete search history.

(56) References Cited

U.S. PATENT DOCUMENTS

| | | | |
|---|---|---|---|
| 2017/0161439 A1* | 6/2017 | Raduchel | G16H 10/60 |
| 2017/0195311 A1 | 7/2017 | Liu et al. | |
| 2020/0321086 A1* | 10/2020 | Rao | H04L 67/10 |
| 2022/0156403 A1 | 5/2022 | Li | |

FOREIGN PATENT DOCUMENTS

| | | |
|---|---|---|
| CN | 103632324 A | 3/2014 |
| CN | 105933353 A | 9/2016 |
| CN | 106845129 A | 6/2017 |
| CN | 107658011 A | 2/2018 |
| CN | 107833601 A | 3/2018 |
| CN | 110890146 A | 3/2020 |
| CN | 111585987 A | 8/2020 |
| WO | 2016169410 A1 | 10/2016 |

OTHER PUBLICATIONS

CN 2020112914447 first office action dated Apr. 27, 2024.
CN 2020112914447 second office action dated Jun. 7, 2024.
Cao Tianjie. "Security Protocol (Second Edition)." Chapter 4 Authentication and Key Establishment Protocol, p. 69-70, dated Sep. 30, 2020.

* cited by examiner

*Primary Examiner* — Jeffrey C Pwu
*Assistant Examiner* — Nega Woldemariam
(74) *Attorney, Agent, or Firm* — IPro, PLLC

(57) ABSTRACT

The present disclosure discloses an interactive method, an electronic device and a storage medium. In an embodiment, the method is applied to an electronic device including an interactive apparatus, and the method includes: receiving login request information and performing identity authentication; displaying information and/or at least one control corresponding to an authentication result; and displaying information corresponding to a control or executing a function corresponding to the control in response to an operation on the control.

18 Claims, 5 Drawing Sheets

FIG.5

INTERACTIVE METHODS, ELECTRONIC DEVICES AND STORAGE MEDIA

CROSS REFERENCE TO RELATED APPLICATIONS

This application claims priority to Chinese Patent Application No. 202011291444.7 entitled "INTERACTIVE METHODS, ELECTRONIC DEVICES AND STORAGE MEDIA" filed on Nov. 18, 2020, the entire content of which is incorporated herein by reference.

TECHNICAL FIELD

The present disclosure relates to the field of computer technologies, and in particular to interactive methods, electronic devices and storage media.

BACKGROUND

At present, many hospitals have used information systems to centrally manage various data. However, in the inpatient department of a hospital, when a patient wants to know the state of an illness, expenses and other information, he/she can only ask the medical staff or consult paper medical records, documents, etc., which is very inconvenient and inefficient, wasting the time and energy of both the patients and the medical staff. In addition, the medical staff also need to carry paper medical records with them to consult patient information during ward rounds or nursing, which is also inconvenient.

SUMMARY

A first aspect of the present disclosure provides an interactive method, which is applied to an electronic device including an interactive apparatus, the method includes: receiving login request information and performing identity authentication; displaying information and/or at least one control corresponding to an authentication result; and displaying information corresponding to a control or executing a function corresponding to the control in response to an operation on the control.

Optionally, displaying the information and/or the at least one control corresponding to the authentication result includes: displaying patient information and/or at least one control corresponding to an authenticated patient; wherein the patient information includes at least one of patient basic information, patient condition information, doctor's advice information, patient nursing information, one or more examination result reports, patient sign information, operation information, medical expenses information, health propagation and education information, or message reminding information.

Optionally, the at least one control includes at least one of a patient basic information control, a patient condition information control, a doctor's advice information control, a patient nursing information control, an examination result report control, a patient sign information control, an operation information control, a medical expenses information control, a health propagation and education information control, or a message reminding information control.

Optionally, the at least one control further includes an audio/video call control, and the method further includes: initiating an audio/video call to a designated terminal in response to an operation on the audio/video call control.

Optionally, the at least one control further includes an evaluation control, and the method further includes: displaying an evaluation content control in response to an operation on the evaluation control, and obtaining an evaluation result in response to an operation on the evaluation content control.

Optionally, displaying the information and/or the at least one control corresponding to the authentication result includes: displaying ward information, patient information and/or at least one control corresponding to an authenticated medical staff; wherein the patient information includes at least one of patient basic information, patient condition information, doctor's advice information, patient nursing information, one or more examination result reports, patient sign information, operation information, medical expenses information, health propagation and education information, or message reminding information.

Optionally, the at least one control at least includes a shift control; and displaying the information corresponding to the control in response to the operation on the control includes: in response to an operation on the shift control, creating a shift record; and displaying shift information or making a shift confirmation; wherein the shift information includes patient basic information, doctor's advice information, an admission condition, an attending doctor, a responsible nurse, a vital sign, one or more inspection and examination reports, or a patient identity identifier.

Optionally, receiving the login request information and performing the identity authentication includes: obtaining the login request information by at least one of the following: displaying an identifier code and obtaining scan code login data through a terminal scanning the identifier code, receiving near field communication data, displaying a login control and receiving account information input through the login control, face recognition, fingerprint recognition, iris recognition or voice recognition; and enabling a server to obtain the login request information, so that the server obtains identity authentication information according to an identity identifier bound with the scan code login data, the near field communication data, the account information, face information, fingerprint information, iris information or voiceprint information, receiving the identity authentication information from the server; and performing identity authentication based on the identity authentication information.

A second aspect of the present disclosure provides an electronic device. The electronic device includes a processor, a memory and an interactive apparatus, wherein the processor and the interactive apparatus are coupled to the processor, the memory is configured to store computer program codes including computer instructions, and when the processor reads the computer instructions from the memory, the electronic device is caused to execute operations including: receiving login request information and performing identity authentication; displaying information and/or at least one control corresponding to an authentication result; and displaying information corresponding to a control or executing a function corresponding to the control in response to an operation on the control.

Optionally, the electronic device is a terminal device disposed in a patient room.

A third aspect of the present disclosure provides a computer storage medium including computer instructions, wherein the computer instructions are executed on a terminal to cause the terminal to perform operations including: receiving login request information and performing identity authentication; displaying information and/or at least one control corresponding to an authentication result; and displaying information corresponding to a control or executing a function corresponding to the control in response to an operation on the control.

BRIEF DESCRIPTION OF DRAWINGS

Hereinafter, the embodiments of the present disclosure will be further described in detail with reference to the accompanying drawings.

FIG. 5 shows a schematic diagram of a user interface according to an embodiment of the present disclosure.

DETAILED DESCRIPTION

Figure 1:
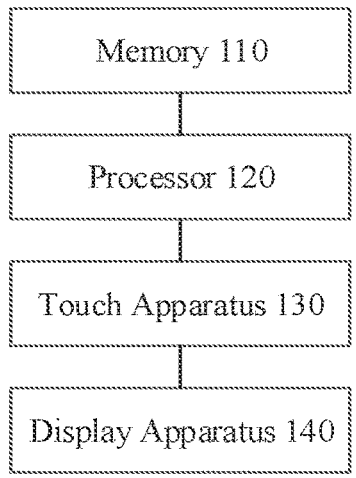
FIG. 1 shows a schematic structural diagram of an electronic device according to an embodiment of the present disclosure.

To illustrate the present disclosure more clearly, the present disclosure will be further described below with reference to embodiments and drawings. Similar elements in the drawings are denoted by the same reference numerals. It will be understood by those skilled in the art that the contents specifically described below are illustrative rather than restrictive, and should not thereby limit the scope of protection of the present disclosure.

In the description of the embodiments of the present disclosure, unless otherwise indicated, "/" represents "or", for example, A/B can represent A or B. Herein, "and/or" is merely an association relationship describing the associated objects, which represents that there can be three relationships. For example, A and/or B can represent three situations: A exists alone, A and B exist at the same time, and B exists alone.

Hereinafter, the terms "first" and "second" are only used for descriptive purposes, and cannot be understood as indicating or implying relative importance or implicitly specifying the number of indicated technical features. Therefore, the features that defined with "first" and "second" may indicate or implicitly include one or more of the features. In the description of the embodiments of the present disclosure, unless otherwise indicated, "a plurality of" means two or more.

In the embodiments of the present disclosure, words such as "exemplary" or "for example" are used to represent as examples, illustrations or description. Any embodiment or design scheme described as "exemplary" or "for example" in the embodiments of the present disclosure should not be interpreted as being more preferred or advantageous than other embodiments or design schemes. Specifically, the use of words such as "exemplary" or "for example" is intended to present relevant concepts in a particular manner.

Exemplary, the electronic device in the present disclosure includes a terminal device having a touch screen (e.g., a tablet computer), which can be installed in a patient room (e.g., beside a patient bed), and is mainly used for the patient to view his/her own information and the medical staff to view patient information and ward information.

FIG. 1 shows a schematic structural diagram of an electronic device 100.

The electronic device 100 includes a memory 110 and a processor 120. It should be understood that the components of the electronic device 100 shown in FIG. 1 are merely exemplary and not limiting, and the electronic device 100 can further include other components according to practical application demands. For example, the electronic device 100 can adopt an operating system such as Windows and Android.

For example, the memory 110 is configured to non-transitory storage of computer-readable instructions; the processor 120 is configured to execute the computer-readable instructions.

For example, as shown in FIG. 1, the electronic device 100 may further include a touch apparatus 130. The touch apparatus 130 is configured to obtain a user's touch operation on the working surface of the touch apparatus 130. For example, the touch apparatus 130 can include any input apparatus with a touch function, such as an electronic pen, a touch screen, a mouse, a touchpad, and an interactive whiteboard. For example, the touch screen can include a capacitive touch screen, such as a self-capacitive touch screen or a mutual-capacitive touch screen, and can also include a resistive touch screen, a surface acoustic wave touch screen, an infrared touch screen, and the like.

For example, the touch apparatus 130 can include a touch sensor and a controller (e.g., a driver IC). The controller receives the electrical signal collected by the touch sensor, processes the electrical signal to obtain the touch signal and provides it to a processor for further processing. The embodiments of the present disclosure do not limit the type, structure and communication manner of the touch apparatus 130. The touch apparatus 130 includes a working surface with a certain area. The user can write directly on the working surface of the touch apparatus 130 with lingers, or use an active stylus or a passive stylus to write on the working surface of the touch apparatus 130, which is not limited by the embodiments of the present disclosure. Here, the working surface refers to a surface for detecting the user's touch operation, such as the touch surface of the touch apparatus 130.

For example, as shown in FIG. 1, the electronic device 100 can further include a, display apparatus 140. The display apparatus 140 is configured to display various interactive interfaces. For example, the display apparatus 140 can include a display apparatus such as a display screen and a projector. The display screen of the display apparatus 140 is, for example, an LCD display screen, an OLED display screen, a QLED display screen, a projection component, a VR head-mounted display device (such as a VR helmet and a VR glasses), an AR display device, etc., Which is not limited by the embodiments of the present disclosure.

For example, in some embodiments, the touch apparatus 130 and the display apparatus 140 can be integrated into, for example, a touch display screen, so that the touch display screen has both a touch function and a display function.

For example, the memory 110 and the processor 120 can be integrated in a touch display screen, and for example, the memory 110 and the processor 120 can also be integrated in a cloud server.

For example, the electronic device 100 can further include a communication module configured to implement communication between the electronic device 100 and other electronic devices. For example, when the electronic device 100 is applied beside a patient bed, the communication module implements interaction with a server, thereby achieving the identity authentication and obtaining various information by the server.

For example, the processor 120 can control other components in the electronic device 100 to perform desired functions. The processor 120 can be a device with data processing capability and/or program execution capability, such as a central processing unit (CPU), a tensor processor (TPU). The central processing unit (CPU) can be X86 or ARM architecture.

For example, the memory 110 can include any combination of one or more computer program products, and the computer program products can include various forms of computer-readable storage media, such as volatile memory and/or non-volatile memory. The volatile memory can include, for example, a random access memory (RAM) and/or a cache, etc. The non-volatile memory can include, for example, a read-only memory (ROM), a hard disk, an erasable programmable read-only memory (EPROM), a portable compact disk read-only memory (CD-ROM), a USB memory, a flash memory, and the like. One or more computer-readable instructions can be stored on the computer-readable storage media, and the processor 120 may execute the computer-readable instructions to implement various functions of the electronic device 100.

For example, components such as the memory 110, the processor 120, the touch apparatus 130 and the display apparatus 140 can communicate with each other through a network. The network can include a wireless network, a wired network, and/or any combination of the wireless network and the wired network. The network can include local area network, Internet, telecommunication network, Internet of Things based on Internet and/or telecommunication network, and/or any combination of the above networks, etc. The wired network can use, for example, twisted pair, coaxial cable or optical fiber transmission for communication and the wireless network can use, for example, 3G/4G/50 mobile communication networks, Bluetooth, Zigbee or WiFi for communication. The type and function of the network are not limited in the present disclosure.

The software system of the electronic device 100 can adopt a layered architecture, an event-driven architecture, a microkernel architecture, a microservice architecture, or a cloud architecture. The embodiments of the present disclosure take an Android system with the layered architecture as an example to illustrate the software structure of the electronic device 100.

Figure 2:
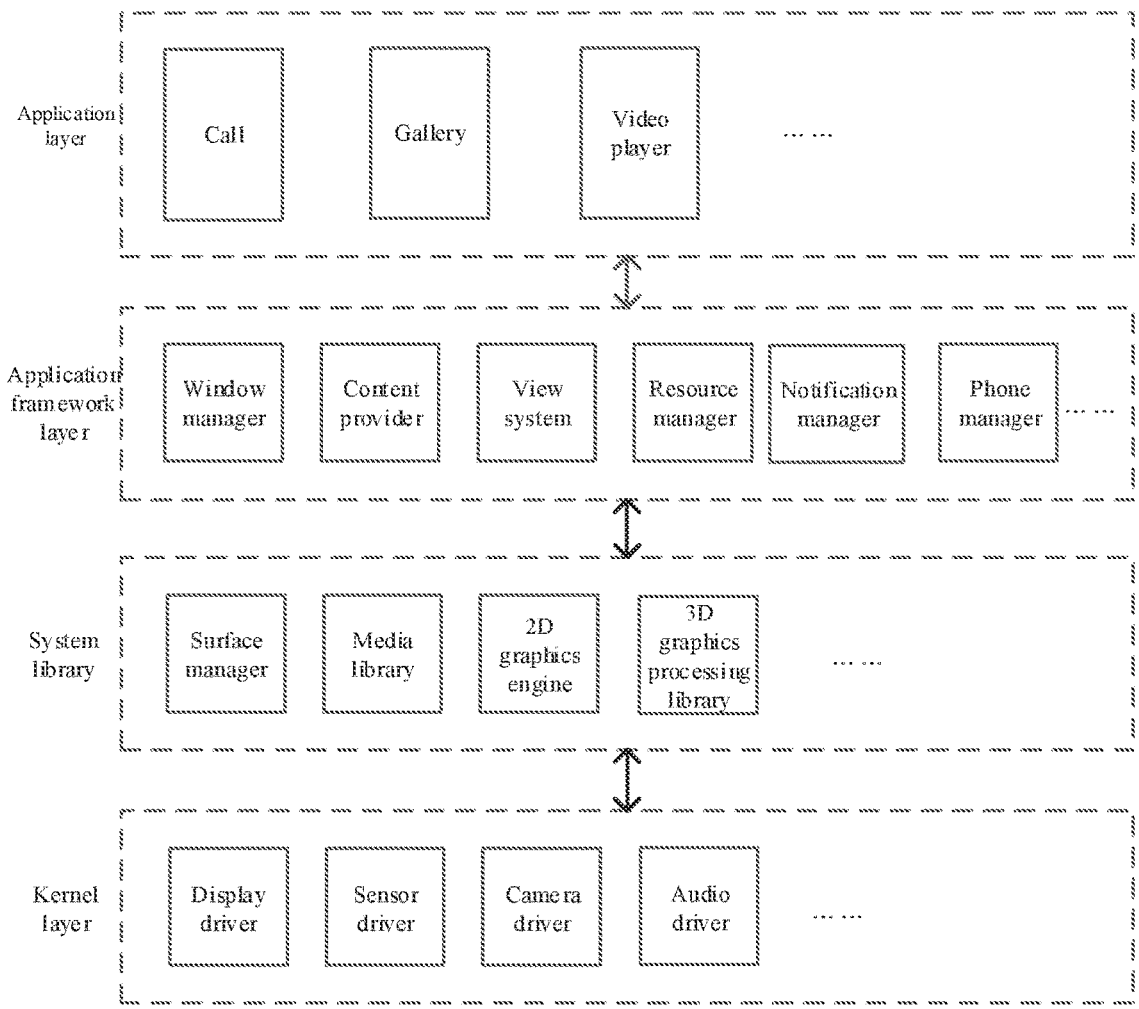
FIG. 2 shows a schematic structural diagram of an electronic device according to another embodiment of the present disclosure.

FIG. 2 shows a block diagram of a software structure of the electronic device 100 according to an embodiment of the present disclosure.

The layered architecture divides the software into several layers, and each layer has a clear role and division of labor. The layers communicate with each other through the software interfaces. In some embodiments, the Android system is divided into four layers, from top to bottom, respectively, an application layer, an application framework layer, a system library and a kernel layer, and the operating environment of the Android system can be an Android runtime.

The application layer can include a series of application packages. As shown in FIG. 2, the application packages can include call, gallery, video player, camera, calendar, map, navigation, WLAN, Bluetooth, music and other applications.

In some embodiments of the present disclosure, the gallery can provide an interface for the electronic device 100 to interact with users (patients or medical staff).

The application framework layer provides an application programming interface (API) and a programming framework for applications in the application layer. The application framework layer includes some predefined functions.

As shown in FIG. 2, the application framework layer can include a window manager, a content provider, a view system, a resource manager, a notification manager, a phone manager, and the like.

The window manager is configured to manage window programs. The window manager can obtain the size of the display screen, determine whether the display screen has a status bar, lock the screen, intercept the screen, etc.

In some embodiments of the present disclosure, the window manager can include a Window Manager Service (WMS). The WMS stores information about various application windows displayed on the current screen, such as the number of application windows displayed on the current screen.

The content provider is configured to store and obtain data, and make these data accessible to applications. The data can include video, images, audio, documents, etc.

The view system includes a visual control, such as a control for displaying text, a control for displaying pictures, and so on. The view system can be configured to build applications, A display interface can include one or more views. For example, a display interface including a short message notification icon can include a view for displaying text and a view for displaying pictures.

The phone manager is configured to provide the communication function of the electronic device 100, for example, the management of the call status (including connecting, hanging up, etc.).

The resource manager provides various resources for the applications, such as localized strings, icons, pictures, layout files, video files and so on.

The notification manager allows the applications to display notification information in the status bar, which can be used to convey various types of messages. The notification information can disappear automatically after a short stay without user interaction. For example, the notification manager is used to inform the user that the download is complete and send a message reminder to the user. The notification manager can also enable the applications to display notification information in the status bar at the top of the system in the form of chart or scroll bar text, such as the notification information of the applications running in the background, and can also enable the applications to display notification information on the screen in the form of dialog window. For example, the notification manager enables the applications to prompt text messages in the status bar, emit prompt sounds, flash indicator lights, etc.

The Android Runtime can include a core library and a virtual machine. The Android Runtime is responsible for the scheduling and management of the Android system.

The core library includes two parts: one part is the function that lava language needs to call, and the other part is the core library of Android.

The application layer and the application framework layer run in the virtual machine. The virtual machine executes Java files of the application layer and the application framework layer as binary files. The virtual machine is used to perform the functions such as object life cycle management, stack management, thread management, security and exception management, garbage collection.

The system library can include a plurality of functional modules. For example, a surface manager, a media library, a 2D graphics engine (e.g., SGL), a 3D graphics processing library (e.g., OpenGL ES), etc.

The surface manager is configured to manage the display subsystem, and provides a combination of 2D graphics layer and 3D graphics layer for a plurality of applications.

The media library supports playback and recording of a variety of commonly used audio and video formats, as well as still image files. The media library can support a variety of audio and video encoding formats, such as MPEG4, H.264, MP3, AAC, AMR, JPG, PNG, etc.

The 3D graphics processing library is configured to implement 3D graphics drawing, image rendering, synthesis, and graphics layer processing.

The 2D graphics engine is a drawing engine of 2D drawing.

The kernel layer is a layer between the hardware and the software. The kernel layer includes a display driver, a camera driver, an audio driver, a sensor driver, etc.

The following embodiments can all be implemented in the electronic device 100 having the above-mentioned hardware architecture and software architecture.

In the interactive method provided in the present disclosure, the patient and the medical staff can trigger the electronic device 100 to display various interfaces including different information and controls through a predefined operation of starting the interactive mode, and perform a predefined operation through the controls displayed on the interface, so as to further realize operations such as calling, evaluation, etc.

Hereinafter, taking the electronic device 100 as a tablet computer including a touch screen as an example, the embodiments of the present disclosure will be described in detail with reference to the accompanying drawings.

Figure 3:
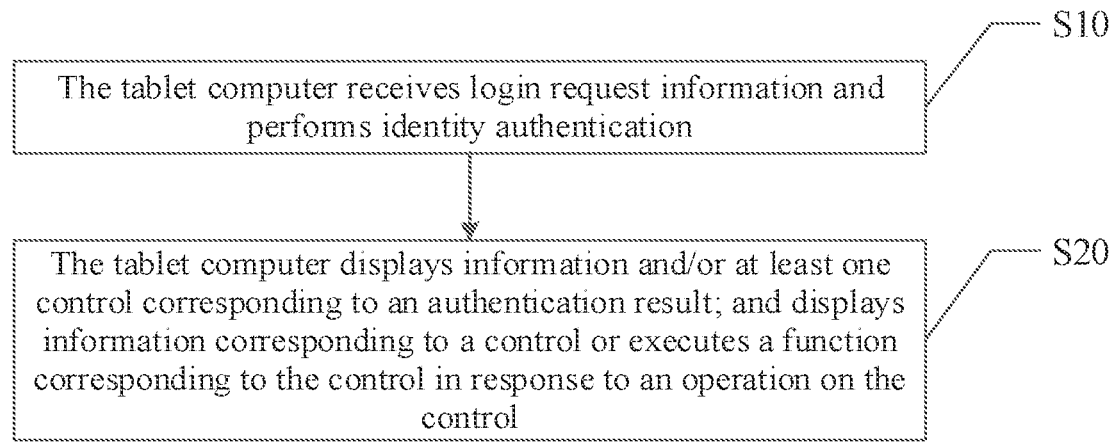
FIG. 3 shows a schematic flowchart of an interactive method according to an embodiment of the present disclosure.

As shown in FIG. 3, an embodiment of the present disclosure provides an interactive method, which can be applied to a tablet computer including a touch screen. The tablet computer can be arranged beside a patient bed (for example, the bedside position), and is mainly used to enable the patients to view their own information and the medical staff to view patient information and ward information. The interactive method includes the following step S10 to step S20.

S10, the tablet computer receives login request information and performs identity authentication.

In some embodiments, receiving the login request information and performing the identity authentication includes: obtaining the login request information by at least one of the following: displaying an identifier code and obtaining scan code login data through a terminal scanning the identifier code, receiving near field communication data, displaying a login control and receiving account information input through the login control, face recognition, fingerprint recognition, iris recognition or voice recognition; and enabling a server to obtain the login request information, for example, sending the login request information to the server, so that the server obtains and returns to the tablet computer identity authentication information according to an identity identifier bound with the scan code login data, the near field communication data, the account information, face information, fingerprint information, iris information or voiceprint information, and the tablet computer performs identity authentication based on the identity authentication information.

Therefore, the patients and the medical staff can conveniently and efficiently authenticate their identities on the tablet computer through various login methods. In this implementation, the server has created an identity identifier for unified login, and binds the identity identifier with the collected user's login information of various types, such as account information, face information, fingerprint information, iris information, etc. For example, the binding process includes: a user (including the patient and the medical staff) uses a mobile terminal to register an account in the server through a telephone number and a password, and completes personal information, such as important information (e.g., identity card number). The server creates an identity identifier for the registered user and binds the created identity identifier with the personal information. The server binds the collected login information (or user recognition information), such as the account information, the face information, the fingerprint information, the iris information, etc., with the identity identifier and store it.

With regard to "obtaining the login request information by receiving near field communication data and enabling a server to obtain the login request information, so that the server obtains and returns to the tablet computer identity authentication information according to an identity identifier bound with the near field communication data, and the tablet computer performs identity authentication based on the identity authentication information", the patients and the medical staff can conveniently log in and authenticate their identities on the tablet computer by using hospitalization cards and job cards with near field communication tag, such as RFID tag, NFC tag and the like. It can be understood that, the tablet computer should be provided with near field communication modules, such as RFID reader, NFC reader and the like.

It can be understood that, the tablet computer should be provided with a device or a module such as a camera, a fingerprint recognizer, an iris recognizer or a voiceprint recognizer corresponding to the adopted authentication method such as face recognition, fingerprint recognition, iris recognition or voice recognition.

Figure 4:
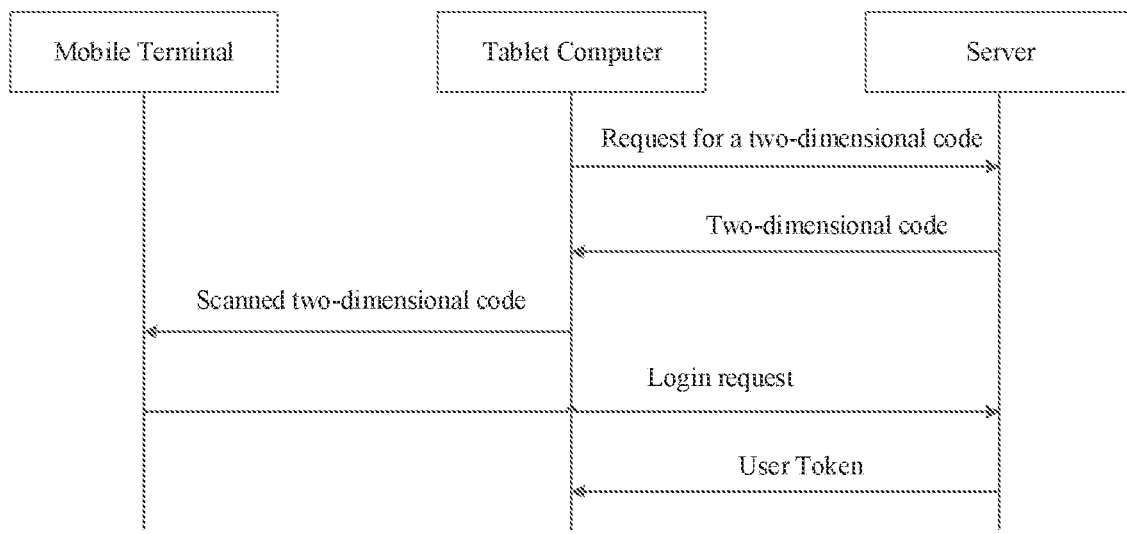
FIG. 4 shows a schematic flowchart of login by scanning code according to an embodiment of the present disclosure.

In an example, the interactive method provided in this embodiment adopts a method of "scan code login" to achieve identity authentication, so as to ensure the security, convenience and efficiency of login. The exemplary flowchart is shown in FIG. 4.

In response to the login trigger operation of the user (patient or medical staff), for example, in response to a user's touch operation such as a finger touch click on the login control displayed on the tablet computer, the tablet computer sends a request for two-dimensional code/QR code to the server.

The server generates a random character string after receiving the request for two-dimensional code, stores the generated random character string as a key value, generates a two-dimensional code according to the random character string and returns it to the tablet computer.

The tablet computer displays the two-dimensional code after receiving it.

In response to a user's scan code trigger operation, for example, in response to a user's touch operation such as a finger touch click on a scan code control displayed on a mobile terminal, the mobile terminal such as a smart phone scans a two-dimensional code displayed on the tablet computer, and then combines a character string identified from the two-dimensional code and the personal information into a login request and sends the login request to the server.

After receiving the login request, the server takes the personal information in the login request as a value to correspond with the above-mentioned key value, and obtains the identity identifier. After obtaining the identity identifier, the server queries the user table, calls the login method to generate a user Token and returns it to the tablet computer.

After obtaining the user Token, the tablet computer completes login or identity authentication, and then displays the interface of corresponding permission.

The communication between the server and the tablet computer and the communication between the server and the terminal device are through the network, and the network can include various connection types, such as wired and wireless communication links.

S20, the tablet computer displays information and/or at least one control corresponding to an authentication result; and displays information corresponding to a control or executes a function corresponding to the control in response to an operation on the control.

In some embodiments, step S20 includes: displaying patient information and/or at least one control corresponding to an authenticated patient; and displaying information corresponding to a control in response to an operation on the control.

In some embodiments, the patient information includes at least one of patient basic information, patient condition information, doctor's advice information, patient nursing information, one or more examination result reports, patient sign information, operation information, medical expenses information, health propagation and education information, or message reminding information. Therefore, various types of information can be comprehensively displayed to the patients.

In some embodiments, the at least one control includes at least one of a patient basic information control, a patient condition information control, a doctor's advice information control, a patient nursing information control, an examination result report control, a patient sign information control, an operation information control, a medical expenses information control, a health propagation and education information control, or a message reminding information control. For example, information names are displayed in the form of icons, and specific information is displayed after users click the icons. Therefore, the patient can be provided with various types of information viewing services based on the limited display area by using the optimized display mode.

For example, the doctor's advice information can include long-term doctor's advice, temporary doctor's advice and nursing focus, and the doctor's advice information is obtained by connecting the tablet computer with the doctor's advice information system and nursing information system in the information system of the hospital, for example, the connecting can be achieved through a server. The display of the doctor's advice information can be set to be updated in real time.

For example, the one or more examination result reports, the patient sign information and medical expenses information can be displayed in the form of medical technology report. The one or more examination result reports can include the classified report or summary report of various examination results, the patient sign information can include the sign value and sign curve obtained in the latest examination, and the medical expenses information includes various expense lists, total expenses amount, deposit amount, balance and the like since this admission.

For example, the operation information can include the patient's recent operation arrangement information, such as anesthesia method, operation name, planned or actual operation time, operating room, operating table number, surgeon, first assistant, etc.

For example, the health propagation and education information can include health propagation and education content, which can be displayed in the form of texts, pictures, videos, etc., and can also be played by audio.

For example, the message reminding information can include, for example, a call, an operation reminder, a dos and don'ts reminder, a propagation and education reminder, and the like. The message reminding information is obtained by connecting the tablet computer with the nursing information system in the information system of the hospital, for example, the connecting can be achieved through a server. The message reminding information can be set in the form of a pop-up window and stored by the tablet computer for the patients to view historical messages.

Figure 5:
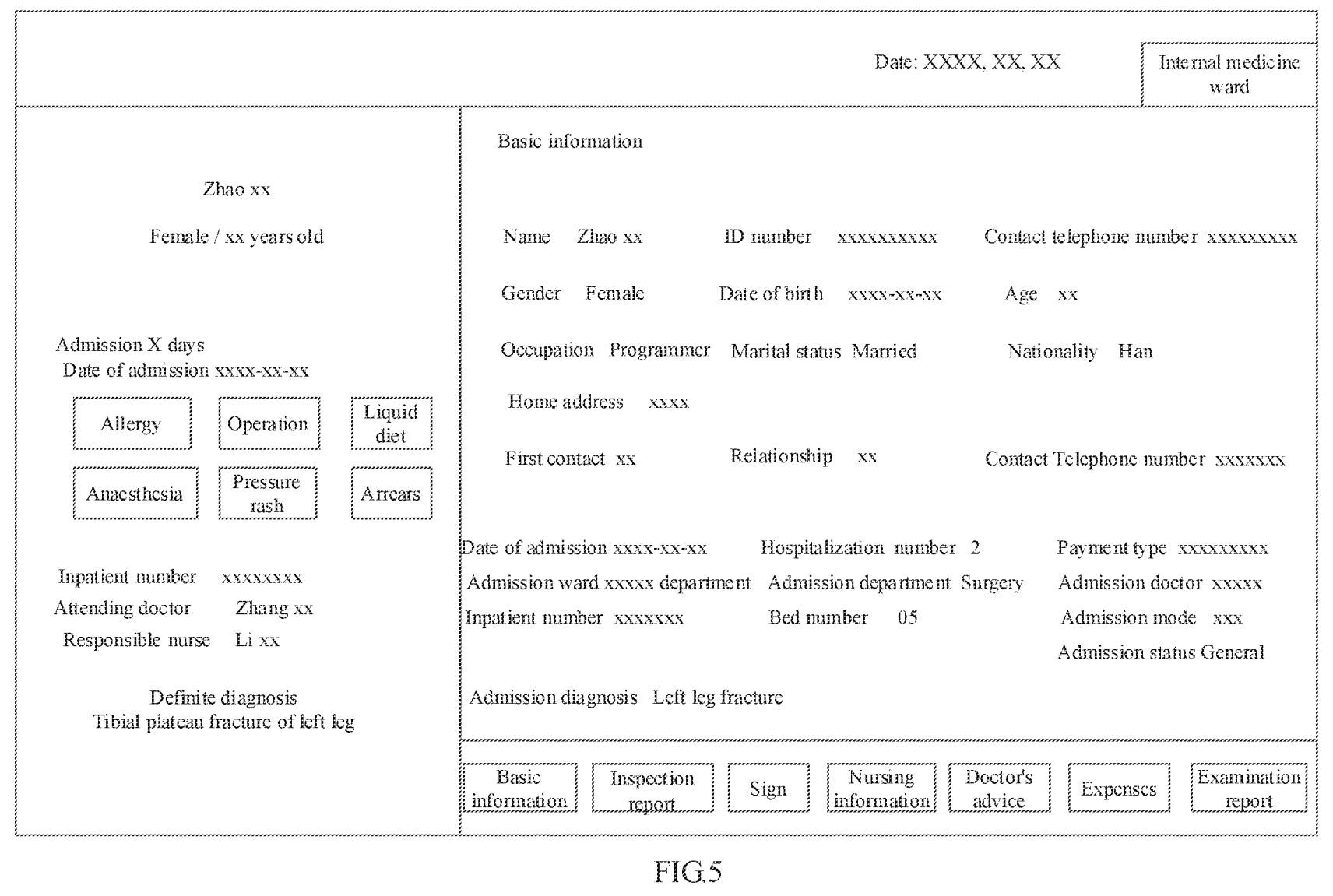

In an example, the patient interface which is displayed on the tablet computer after identity authentication and includes patient information and at least one control corresponding to the authenticated patient is shown in FIG. 5. The patient interface displays the patient basic information, the patient condition information and the patient nursing information of patient Zhao XX with bed number 5, such as contact telephone number, occupation, admission diagnosis information and the like shown in FIG. 5. The patient interface can also be provided with controls such as an inspection report control, a sign control and a nursing information control shown in the lower right side in FIG. 5. After the patient applies a touch operation such as a finger touch click, the patient interface displays the corresponding inspection report details information, sign details information, nursing details information, and the like in a manner of interface jumping, pop-up, etc. In this way, the limited display area can be used to properly display all patient details information. In addition, all patient details information can also be displayed automatically on a loop at an interval of a preset time period, which is not limited in this embodiment.

In some embodiments, the at least one control further includes an audio/video call control, and step S20 further includes initiating an audio video call to a designated terminal in response to an operation on the audio/video call control. Therefore, the patient can conveniently communicate with, for example, a nurse in a nurse station through an electronic device integrating a calling function, so as to request nursing, etc. The medical staff can conveniently communicate with the medical staff in the nurse station, doctor's office or other wards through the electronic device integrating a calling function, so as to call for assistance, etc. In an example, the tablet computer can display a call status in real time, including calling, waiting for answering, busy, busy tone, no answer, hung up, etc.

In some embodiments, the at least one control further includes an evaluation control, and step S20 further includes: displaying an evaluation content control (selection bar or text input box) in response to an operation on the evaluation control, and obtaining an evaluation result in response to an operation on the evaluation content control. Therefore, the functions of the electronic device are more abundant and the patient experience is further improved. In an example, the tablet computer can send the obtained patients' overall satisfaction evaluation results, patients' satisfaction evaluation results for nursing work, and patients' satisfaction evaluation results for a nurse to the server for storage.

In some embodiments, step S20 further includes: displaying ward information, patient information and/or at least one control corresponding to an authenticated medical staff; and displaying information corresponding to a control or executing a function corresponding to the control in response to an operation on the control.

Further, step S20 includes: displaying a shift control corresponding to the authenticated medical staff; and creating a shift record and displaying shift information or making a shift confirmation in response to an operation on the shift control. In an example, the shift information can include, for example, patient basic information, doctor's advice information, an admission condition, an attending doctor, a responsible nurse, a vital sign, an inspection and examination report, a patient identity identifier, etc., which can be displayed in the form of icon controls. The medical staff can apply a touch operation such as a finger touch click on the icon controls, and the tablet computer displays corresponding detailed information in response to the touch operation.

In some embodiments, the method further includes displaying corresponding information or executing corresponding functions in response to voice operation instructions. That is, the tablet computer supports voice control.

To sum up, with the interactive method of the present disclosure, convenient information viewing and operation services can be provided for the patients and the medical staff by using an electronic device such as a tablet computer arranged beside a patient bed. After the patients or the medical staff have been authenticated by the tablet computer, they can directly view various related information and perform various operations through the tablet computer, which improves the convenience and efficiency of the patients and the medical staff to view information and perform operations.

Figure 6:
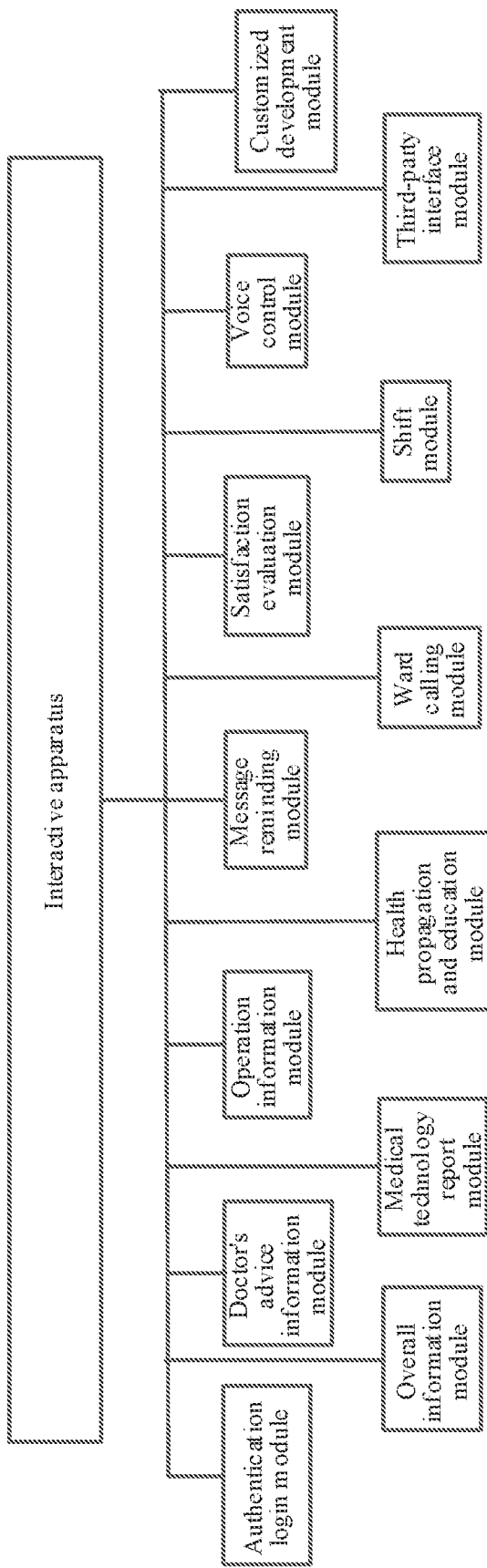
FIG. 6 shows a schematic structural diagram of an interactive apparatus according to another embodiment of the present disclosure.

Based on the above, the embodiment of the present disclosure also provides an interactive apparatus, which is applied to a tablet computer including a touch screen, and the tablet computer can be arranged beside a patient bed. As shown in FIG. 6, the interactive apparatus includes the following:

an authentication login module, configured to receive login request information and perform identity authentication. The authentication login module supports a plurality of login manners (for example, built-in RFID function to support job card login, support face recognition, and support permission switching through an NW, card swipe, etc.); the tablet computer is in a non-login status by default, and displays a corresponding function list of the first page; when a user logs in, the corresponding function list is displayed according to different login users;

an overall information module, configured to display patient basic information, patient condition information, patient nursing information, current time and the like;

a doctor's advice information module, configured to connect the doctor's advice information system and nursing information system, so as to obtain and display long-term doctor's advice, temporary doctor's advice and nursing focus;

a medical technology report module, configured to display the one or more examination result reports, the patient sign information and the medical expenses information in response to the inquiry operation of the user;

an operation information module configured to display operation information;

a health propagation and education module configured to display health propagation and education information;

a message reminding module, configured to connect nursing information systems and the like, so as to obtain and display message reminding information;

a ward calling module, configured to initiate an audio/video call to a designated terminal in response to an operation on an audio/video call control or a physical key;

a satisfaction evaluation module, configured to display an evaluation content control in response to an operation on the evaluation control, and obtain an evaluation result in response to an operation on the evaluation content control, so as to realize the satisfaction evaluation of the patients and complete the satisfaction survey;

a shift module, configured to in response to an operation on the shift control, create a shift record; and display shift information or make a shift confirmation;

a voice control module, configured to display corresponding information or execute corresponding functions in response to the voice control instruction, so as to realize voice control;

a third-party interface module, configured to connect with a third-party system to realize access of the third-party system, for example, business systems such as media audio and video, catering, nursing management, insurance and the like;

a customized development module, configured to perform customized development according to the nursing service characteristics of various hospitals, so as to realize function expansion.

Figure 7:
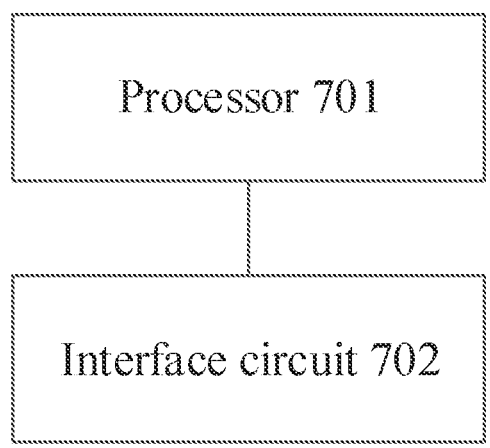
FIG. 7 shows a schematic structural diagram of an electronic device according to another embodiment of the present disclosure.

An embodiment of the present disclosure also provides a chip system, as shown in FIG. 7, the chip system includes at least one processor 701 and at least one interface circuit 702. The processor 701 and the interface circuit 702 can be interconnected through lines. For example, the interface circuit 702 can be used to receive signals from other apparatuses (e.g., a memory of a mobile terminal). For another example, the interface circuit 702 can be used to send signals to other apparatuses (e.g., the processor 701). For example, the interface circuit 702 can read the instructions stored in the memory and send the instructions to the processor 701. When the instructions are executed by the processor 701, the electronic device can be caused to execute each step executed by the electronic device 100 (e.g., a tablet computer) in the above embodiments, Of course, the chip system can also include other discrete devices, which is not specifically limited in the embodiment of the present disclosure.

It can be understood that, in order to realize the above functions, the above-mentioned terminals and the like include hardware structures and/or software modules corresponding to each function. Those skilled in the art should readily realize that the embodiments of the present disclosure can be implemented in hardware or a combination of hardware and computer software in combination with the units and algorithm steps described in the embodiments disclosed herein. Whether a certain function is executed by hardware or by computer software driving hardware depends on the particular application and design constraints of the embodiment. Professionals can use different methods to implement the described functions for each articular application, but such implementation should not be considered beyond the scope of embodiments of the present disclosure.

According to the above method examples, the embodiment of the present disclosure can divide functional modules for the above-mentioned terminal, for example, each functional module can be divided corresponding to each function, or two or more functions can be integrated into one processing module. The above integrated modules can be implemented in the form of hardware or software functional modules. It should be noted that the division of the modules in the embodiment of the present disclosure is schematic, and is merely a logical function division, and there may be another division manner in actual implementation.

From the description of the above embodiments, those skilled in the art can clearly understand that, for the convenience and simplicity of description, only the division of the above-mentioned functional modules is taken as an example for illustration. In practical application, the above-mentioned functions can be allocated as required to be completed by different functional modules. That is, the internal structure of the apparatus can be divided into different functional modules to complete all or part of the functions described above. For the specific working processes of the system, apparatus and unit described above can refer to the corresponding processes in the foregoing method embodiments, and details are not described here again.

Each functional unit in each embodiment of the present disclosure can be integrated into one processing unit, or each unit can be physically present separately, or two or more units can be integrated into one unit. The above-mentioned integrated units can be implemented in the form of hardware or software functional units.

The integrated unit can be stored in a computer readable storage medium if implemented in the form of a software functional unit and sold or used as an independent product. Based on such understanding, the technical solutions of the embodiments of present disclosure essentially or in part contributing to the prior art or all or part of the technical solutions can be embodied in the form of software products. The computer software products are stored in a storage medium and include several instructions to cause a computer device (which can be a personal computer, a server, or a network device, etc.) or a processor execute all or part of the steps of the methods described in various embodiments of the present disclosure. The above-mentioned storage medium includes a flash memory, a removable hard disk, a read-only memory, a random access memory, a magnetic disk or an optical disk, and other media that can store program codes.

Obviously, the above-mentioned embodiments of the present disclosure are merely examples made to clearly illustrate the present disclosure, hut are not a limitation of the implementation of the present disclosure. For those of ordinary skill in the art, other changes or variations in different forms can also be made on the basis of the above description. All the implementations cannot be exhaustively described herein, and all obvious changes or variations derived from the embodiments of the present disclosure are still within the scope of protection of the present disclosure.

What is claimed is:

1. An interactive method applied to an electronic device comprising an interactive apparatus, wherein the electronic device is installed in a patient room for a patient to view his/her own information and a medical staff to view patient information and ward information, and the method comprising:
   receiving login request information and performing identity authentication;
   displaying information and/or at least one control corresponding to an authentication result; and
   displaying information corresponding to a control or executing a function corresponding to the control in response to an operation on the control;
   wherein receiving the login request information and performing the identity authentication comprises:
      obtaining the login request information by at least one of the following: displaying an identifier code and obtaining scan code login data through a terminal scanning the identifier code, receiving near field communication data, displaying a login control and receiving account information input through the login control, face recognition, fingerprint recognition, iris recognition or voice recognition; and enabling a server to obtain the login request information, so that the server obtains identity authentication information according to an identity identifier bound with the scan code login data, the near field communication data, the account information, face information, fingerprint information, iris information or voiceprint information;
      receiving the identity authentication information from the server; and
      performing identity authentication based on the identity authentication information;
   wherein obtaining the login request information by receiving the near field communication data, and enabling the server to obtain the login request information comprises:
      obtaining the login request information by receiving an identity identifier bound with the near field communication data in a hospitalization card or a job card, and enabling the server to obtain the login request information;
   wherein obtaining the login request information by displaying an identifier code and obtaining scan code login data through a terminal scanning the identifier code, and enabling the server to obtain the login request information comprises:
      in response to a login trigger operation of a user, sending a request for two-dimensional code to the server, so that the server generates a random character string after receiving the request for two-dimensional code, stores the random character string as a key value, generates a two-dimensional code according to the random character string and returns the two-dimensional code to the electronic device;
      receiving and displaying the two-dimensional code returned by the server, wherein the two-dimensional code is used to be scanned by the terminal to identify a character string from the two-dimensional code, and the character string and personal information are combined into a login request and the login request is sent to the server, so that after receiving the login request, the server takes the personal information in the login request as a value to correspond with the key value, obtains the identity identifier, queries a user table, calls a login method to generate a user Token and returns the user Token to the electronic device.

2. The method according to claim 1, wherein,
   displaying the information and/or the at least one control corresponding to the authentication result comprises:
      displaying patient information and/or at least one control corresponding to an authenticated patient;
   wherein the patient information comprises at least one of patient basic information, patient condition information, doctor's advice information, patient nursing information, one or more examination result reports, patient sign information, operation information, medical expenses information, health propagation and education information, or message reminding information.

3. The method according to claim 2, wherein the at least one control comprises at least one of a patient basic information control, a patient condition information control, a doctor's advice information control, a patient nursing information control, an examination result report control, a patient sign information control, an operation information control, a medical expenses information control, a health propagation and education information control, or a message reminding information control.

4. The method according to claim 3, wherein the at least one control further comprises an audio/video call control, and the method further comprises:
  initiating an audio/video call to a designated terminal in response to an operation on the audio/video call control.

5. The method according to claim 3, wherein the at least one control further comprises an evaluation control, and the method further comprises:
  displaying an evaluation content control in response to an operation on the evaluation control, and
  obtaining an evaluation result in response to an operation on the evaluation content control.

6. The method according to claim 1, wherein,
  displaying the information and/or the at least one control corresponding to the authentication result comprises:
    displaying ward information, patient information and/or at least one control corresponding to an authenticated medical staff;
  wherein the patient information comprises at least one of patient basic information, patient condition information, doctor's advice information, patient nursing information, one or more examination result reports, patient sign information, operation information, medical expenses information, health propagation and education information, or message reminding information.

7. The method according to claim 6, wherein the at least one control at least comprises a shift control; and
  displaying the information corresponding to the control in response to the operation on the control comprises:
    in response to an operation on the shift control, creating a shift record; and
    displaying shift information or making a shift confirmation;
  wherein the shift information comprises patient basic information, doctor's advice information, an admission condition, an attending doctor, a responsible nurse, a vital sign, one or more inspection and examination reports, or a patient identity identifier.

8. An electronic device, wherein the electronic device is installed in a patient room for a patient to view his/her own information and a medical staff to view patient information and ward information, and the electronic device comprising:
  a processor, a memory and an interactive apparatus, wherein the processor and the interactive apparatus are coupled to the processor, the memory is configured to store computer program codes comprising computer instructions, and when the processor reads the computer instructions from the memory, the electronic device is caused to execute operations comprising:
    receiving login request information and performing identity authentication;
    displaying information and/or at least one control corresponding to an authentication result; and
    displaying information corresponding to a control or executing a function corresponding to the control in response to an operation on the control;
  wherein receiving the login request information and performing the identity authentication comprises:
    obtaining the login request information by at least one of the following: displaying an identifier code and obtaining scan code login data through a terminal scanning the identifier code, receiving near field communication data, displaying a login control and receiving account information input through the login control, face recognition, fingerprint recognition, iris recognition or voice recognition; and enabling a server to obtain the login request information, so that the server obtains identity authentication information according to an identity identifier bound with the scan code login data, the near field communication data, the account information, face information, fingerprint information, iris information or voiceprint information,
    receiving the identity authentication information from the server; and
    performing identity authentication based on the identity authentication information;
  wherein obtaining the login request information by receiving the near field communication data, and enabling the server to obtain the login request information comprises:
    obtaining the login request information by receiving an identity identifier bound with the near field communication data in a hospitalization card or a job card, and enabling the server to obtain the login request information;
  wherein obtaining the login request information by displaying an identifier code and obtaining scan code login data through a terminal scanning the identifier code, and enabling the server to obtain the login request information comprises:
    in response to a login trigger operation of a user, sending a request for two-dimensional code to the server, so that the server generates a random character string after receiving the request for two-dimensional code, stores the random character string as a key value, generates a two-dimensional code according to the random character string and returns the two-dimensional code to the electronic device;
    receiving and displaying the two-dimensional code returned by the server, wherein the two-dimensional code is used to be scanned by the terminal to identify a character string from the two-dimensional code, and the character string and personal information are combined into a login request and the login request is sent to the server, so that after receiving the login request, the server takes the personal information in the login request as a value to correspond with the key value, obtains the identity identifier, queries a user table, calls a login method to generate a user Token and returns the user Token to the electronic device.

9. The electronic device according to claim 8, wherein, displaying the information and/or the at least one control corresponding to the authentication result comprises:
  displaying patient information and/or at least one control corresponding to an authenticated patient;
  wherein the patient information comprises at least one of patient basic information, patient condition information, doctor's advice information, patient nursing information, one or more examination result reports, patient sign information, operation information, medical expenses information, health propagation and education information, or message reminding information.

10. The electronic device according to claim 9, wherein the at least one control comprises at least one of a patient basic information control, a patient condition information control, a doctor's advice information control, a patient nursing information control, an examination result report control, a patient sign information control, an operation information control, a medical expenses information control, a health propagation and education information control, or a message reminding information control.

11. The electronic device according to claim 10, wherein the at least one control further comprises an audio/video call control, and when the processor reads the computer instructions from the memory, the electronic device is further caused to execute the operations comprising:
　initiating an audio/video call to a designated terminal in response to an operation on the audio/video call control.

12. The electronic device according to claim 10, wherein the at least one control further comprises an evaluation control, and when the processor reads the computer instructions from the memory, the electronic device is further caused to execute the operations comprising:
　displaying an evaluation content control in response to an operation on the evaluation control, and
　obtaining an evaluation result in response to an operation on the evaluation content control.

13. The electronic device according to claim 8, wherein displaying the information and/or the at least one control corresponding to the authentication result comprises: displaying ward information, patient information and/or at least one control corresponding to an authenticated medical staff;
　wherein the patient information comprises at least one of patient basic information, patient condition information, doctor's advice information, patient nursing information, one or more examination result reports, patient sign information, operation information, medical expenses information, health propagation and education information, or message reminding information.

14. The electronic device according to claim 13, wherein the at least one control at least comprises a shift control; and when the processor reads the computer instructions from the memory, the electronic device is further caused to execute the operations comprising:
　in response to an operation on the shift control,
　　creating a shift record; and
　　displaying shift information or making a shift confirmation;
　wherein the shift information comprises patient basic information, doctor's advice information, an admission condition, an attending doctor, a responsible nurse, a vital sign, one or more inspection and examination reports, or a patient identity identifier.

15. The electronic device according to claim 8, wherein the electronic device is a terminal device disposed in the patient room.

16. A non-transitory computer storage medium comprising computer instructions, wherein the computer instructions are executed on a terminal to cause the terminal to perform operations comprising:
　receiving login request information and performing identity authentication;
　displaying information and/or at least one control corresponding to an authentication result; and
　displaying information corresponding to a control or executing a function corresponding to the control in response to an operation on the control;
　wherein receiving the login request information and performing the identity authentication comprises:
　　obtaining the login request information by at least one of the following: displaying an identifier code and obtaining scan code login data through a terminal scanning the identifier code, receiving near field communication data, displaying a login control and receiving account information input through the login control, face recognition, fingerprint recognition, iris recognition or voice recognition; and
　　enabling a server to obtain the login request information, so that the server obtains identity authentication information according to an identity identifier bound with the scan code login data, the near field communication data, the account information, face information, fingerprint information, iris information or voiceprint information,
　　receiving the identity authentication information from the server; and
　　performing identity authentication based on the identity authentication information;
　wherein obtaining the login request information by receiving the near field communication data, and enabling the server to obtain the login request information comprises:
　　obtaining the login request information by receiving an identity identifier bound with the near field communication data in a hospitalization card or a job card, and enabling the server to obtain the login request information;
　wherein obtaining the login request information by displaying an identifier code and obtaining scan code login data through a terminal scanning the identifier code, and enabling the server to obtain the login request information comprises:
　　in response to a login trigger operation of a user, sending a request for two-dimensional code to the server, so that the server generates a random character string after receiving the request for two-dimensional code, stores the random character string as a key value, generates a two-dimensional code according to the random character string and returns the two-dimensional code to the terminal;
　　receiving and displaying the two-dimensional code returned by the server, wherein the two-dimensional code is used to be scanned by the terminal to identify a character string from the two-dimensional code, and the character string and personal information are combined into a login request and the login request is sent to the server, so that after receiving the login request, the server takes the personal information in the login request as a value to correspond with the key value, obtains the identity identifier, queries a user table, calls a login method to generate a user Token and returns the user Token to the terminal;
　wherein the terminal is installed in a patient room for a patient to view his/her own information and a medical staff to view patient information and ward information.

17. The computer storage medium according to claim 16, wherein,
　displaying the information and/or the at least one control corresponding to the authentication result comprise:
　　displaying patient information and/or at least one control corresponding to an authenticated patient;

wherein the patient information comprises at least one of patient basic information, patient condition information, doctor's advice information, patient nursing information, one or more examination result reports, patient sign information, operation information, medical expenses information, health propagation and education information, or message reminding information.

18. The computer storage medium according to claim 17, wherein the at least one control comprises at least one of a patient basic information control, a patient condition information control, a doctor's advice information control, a patient nursing information control, an examination result report control, a patient sign information control, an operation information control, a medical expenses information control, a health propagation and education information control, or a message reminding information control.

* * * * *